(12) United States Patent
Ammar et al.

(10) Patent No.: US 6,215,766 B1
(45) Date of Patent: Apr. 10, 2001

(54) HIERARCHICAL RATE CONTROL OF RECEIVERS IN A COMMUNICATION SYSTEM TRANSMITTING LAYERED VIDEO MULTICAST DATA WITH RETRANSMISSION (LVMR)

(75) Inventors: Mostafa Ammar, Dekalb; Xue Li, Fulton, both of GA (US); Pramod Pancha, Somerset; Sanjoy Paul, Monmouth, both of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/016,836

(22) Filed: Jan. 30, 1998

(51) Int. Cl.⁷ .................................................. H04L 12/28
(52) U.S. Cl. ........................ 370/229; 370/235; 370/465; 370/256; 709/235
(58) Field of Search .................................... 370/229, 230, 370/235, 237, 256, 401, 418, 465; 709/219, 234, 235, 247

(56) References Cited

U.S. PATENT DOCUMENTS

| | | | |
|---|---|---|---|
| 5,303,237 | * 4/1994 | Bergman et al. | 370/418 |
| 5,515,377 | * 5/1996 | Horne et al. | 370/465 |
| 5,768,535 | * 6/1998 | Chaddha et al. | 709/247 |
| 5,920,566 | * 6/1999 | Hendel et al. | 370/401 |

* cited by examiner

Primary Examiner—Chi H. Pham
Assistant Examiner—Maikhanh Tran (57) ABSTRACT

Layered Video Multicast with Retransmissions (LVMR) is a system for distributing video content using layered coding over the Internet. The two key contributions of the system are (1) improving the quality of reception within each layer by retransmitting lost packets given an upper bound on recovery time and applying an adaptive playback point scheme to help achieve more successful retransmission, and (2) adapting to network congestion and heterogeneity using a hierarchical rate control mechanism. A hierarchical rate control system and method is disclosed for regulating the flow of video information in a network by establishing subnet agents for each subnet, and by establishing intermediate agents for each domain. The subnet agents gather information concerning add-layer experiments conducted by receivers in a subnet, and the information is provided to intermediate agents of the domains for regulating data traffic.

10 Claims, 5 Drawing Sheets

HIERARCHICAL RATE CONTROL OF RECEIVERS IN A COMMUNICATION SYSTEM TRANSMITTING LAYERED VIDEO MULTICAST DATA WITH RETRANSMISSION (LVMR)

FIELD OF THE INVENTION

The present invention relates to the transfer of video information over the internet or over intranet systems. More particularly, the present invention is directed to a method and apparatus for providing, in the transmission of a video signal, efficient adding and dropping of video layers received by receivers in a data communication system to reduce data interference associated with realtime video distribution.

DISCUSSION OF RELATED ART

In recent years, there has been a rapid expansion of the internet and intranets, and significant increase in both computer processing power and network bandwidth. Such infrastructure improvements have introduced opportunities for new multimedia applications over networks, such as video conferencing, distance learning, remote presentation, and media on demand, applications that typically involve real-time video distribution. Approaches proposed to handle the realtime aspect of video distribution over networks fall into two categories: (1) the use of a network capable of resource reservation to provide performance guarantees, and (2) the use of adaptive control to adjust multimedia traffic characteristics to meet the network capacity. Both Research Reservation Protocol (RSVP) and Asynchronous Transfer Mode (ATM), which offer network-level reservations, are not yet available for ubiquitous use in real-time video distribution. Even when reservations are available, there are two reasons to apply adaptation techniques: (1) it is difficult to plan particularly accurate reservations so that some adaptation is required to allow tolerance in reservation accuracy; and (2) in view of the cost of resource reservation, it is more efficient to reserve only enough resources to provide the basic required video quality and to then transmit and add on other enhancement layers with best-effort network support and adaptive control.

Due to the heterogeneity of the internet, multicasting of the same video stream to a multiplicity of receivers distributed on a wide range may cause a significant problem. In particular, the video stream may congest certain low-capacity or heavily loaded portions or segments of the network, while some other high-capacity or lightly loaded portions remain under-utilized. However, in an ideal system, each receiver should receive a video stream of a quality commensurate with its processing power and the bandwidth capacity of the path leading to that receiver.

One way of ensuring fair distribution is to multicast different layers of video (which individually contain progressive enhancement layers) using different multicast addresses and to allow the individual receivers to decide which multicast group(s) to subscribe to, i.e. which enhancement layers to receive and add to the signal. An alternative approach is to multicast replicated streams and use destination set grouping (DSG) protocols for improving the fairness of video distribution in a heterogeneous network with only a small bandwidth cost overhead. Layered Video Multicast with Retransmissions (LVMR) addresses the network congestion and heterogeneity problem using layered video coding techniques by allowing each receiver to subscribe to a subset of the video layers as a function of its processing power and network bandwidth availability. LVMR also deploys an error recovery scheme using smart retransmission and adaptive playback point.

There have been two principal approaches employed to address the rate control problem in video multicast: sender-initiated control, and receiver-initiated control. In the sender-initiated approach, the sender multicasts a single video stream whose quality is adjusted based on feedback information from the receivers. The receiver-initiated approach, on the other hand, is usually based on a layered video coding scheme in which the sender multicasts several layers of video (typically a base layer and several enhancement layers) in different multicast groups, and a receiver subscribes to one or more of the layers based on its capabilities. This scheme is "receiver-initiated" in the sense that each receiver determines on its own whether to drop or add a particular enhancement layer.

Comparing LVMR with Receiver-driven Layered Multicast (RLM), both systems deploy layered video multicast schemes but differ in the mechanisms used for adding or dropping a layer. In RLM, a fully distributed approach is advocated in which a receiver, by itself, makes decisions to add or drop an enhancement layer. This decision is enhanced by a "shared learning" process in which information from experiments (i.e. prior attempts by receivers to add or drop enhancement layers) conducted by other receivers is used to improve performance. Shared learning, although providing an improvement to indiscriminate adding and dropping of layers, requires that each receiver maintain a variety of state information parameters that it may or may not require. In addition, the use of multicasting to exchange control information may decrease usable bandwidth on low speed links and lead to lower quality for receivers on these links.

In LVMR, however, a hierarchical approach in the receivers' dynamic rate control schemes is used to allow receivers to maintain minimal state information and decrease control traffic on the multicast session. LVMR also provides more functionality as compared to simple receiver-driven schemes such as RLM. In particular, it allows multiple experiments to be conducted simultaneously, and also helps to drop, in most cases, the correct enhancement layer(s) during periods of congestion, i.e. to drop those enhancement layers that will alleviate the congestion.

The network mechanism employed for video distribution is Internet Protocol (IP)-multicast which, by virtue of its use of the Internet Group Management Protocol (IGMP) and a multicast routing protocol such as Distance Vector Multicast Routing Protocol (DVMRP), Protocol Independent Multicast (PIM) or Core-Based Tree (CBT), sets up a multicast tree spanning all receivers. The multicast tree is defined by the IP-address of the sender and a Class-D IP-address of the group. Receivers can dynamically join and leave a multicast group, thereby resulting in dynamic reconfiguration of the multicast tree. The sender of a message or signal to the multicast group need not know the identity of the receivers, and can therefore continue to send IP packets using the Class-D IP-address representing the group irrespective of any ongoing reconfiguration. On the other hand, it is the responsibility of the receivers to inform the nearest router(s) that those receivers are a part of a specific group.

SUMMARY OF THE INVENTION

The deficiencies of the prior art are addressed herein by a method and apparatus for providing hierarchical data flow rate control of a video signal transmitted through a network to a plurality of receivers. The video signal contains layers of data and, in particular, a base layer and various enhancement layers which are arranged according to a hierarchy such that the base layer is necessary to obtain the video information, a first enhancement layer can be received and decoded along with the base layer, a second enhancement layer can be received and decoded with the base layer and the first enhancement layer, etc. Each receiver receiving a particular video signal may receive different layers of the signal depending, for example, on the particular receiver's capability. Thus, a first receiver may receive the base layer, and a second receiver may receive the base layer and the first enhancement layer.

The inventive method and apparatus segregate the network into domains and subnets, with the receivers divided among the subnets based on criteria such as receiver location. Each domain is assigned an intermediate agent (IA) and each subnet is assigned a subnet agent (SA). Add-layer experiment history data derived from prior attempts made by receivers in the network to add video enhancement layers is obtained. The experiment history data contains information concerning successful and failed add-layer attempts made by receivers, such as which video layers were added successfully and/or unsuccessfully under which conditions. The experiment history is communicated from the SA to the IA containing the subnet and is used to allow or deny receiver add experiments so that congestion conditions which affect data rate can be avoided or reduced. The experiment history data is also used to instruct a particular receiver to drop its highest status layer of a particular video signal when a congestion condition is detected so as to minimize the effect on other receivers receiving that particular video signal.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein like reference numerals denote similar elements throughout the several views.

DETAILED DESCRIPTION OF PRESENTLY PREFERRED EMBODIMENT

1. Overview of Layered Video Compression

The use of layered encoding schemes enables video multicast schemes to deliver optimal quality to receivers with heterogeneous capabilities. Layered encoding schemes separate an encoded video stream into two or more layers. There is one base layer and one or more enhancement layers. The base layer can be independently decoded and provides a "basic" level of video quality. The enhancement layers can only be decoded together with the base layer and provide improvements to video quality.

Layered multicasts provide a finer granularity of control as compared to using a single video stream, because a receiver may subscribe to one, two, or more layers depending on its capabilities. If a receiver experiences packet loss as a result of network congestion, dropping one or more layers will reduce congestion and, hence, will reduce potential packet loss.

The inventive hierarchical rate control scheme is designed for utilizing several software and hardware MPEG decoders and provides a simple way to achieve layering in a manner similar to temporal scalability. In MPEG video coding, frames are coded in one of three modes: intraframe (I), predictive (P) or bidirectionally-predictive (B). These modes provide intrinsic layers in that an I frame can be independently decoded, while P frames require I frames to decode and B frames generally require I and P frames to decode. By using a multicast group for each frame type, a simple layering mechanism is obtained.

The choice of layering technique is strongly influenced by the need for easy integration of any scheme with current MPEG-based systems. In the inventive embodiment herein described by way of illustrative example, the layering is implemented as a postprocessing filter for a standard MPEG bit stream. After an MPEG stream is encoded, a filter passes the output MPEG bit stream to identify markers that demarcate the start of a video frame. Next, the frame type field is decoded and, based on the frame type, bits of the MPEG stream are directed to the appropriate multicast group until the next marker identifies the start of a new video frame. At the decoder, a multiplexer is used to sequence video data from the different multicast groups so that an MPEG decoder is able to decode the resulting multiplexed stream.

2. Layered Video Multicast With Retransmission (LVMR) System Overview

LVMR system architecture addresses application, application-control, and transport layers. The application layer consists of the video server which is responsible for digitizing and coding video frames at the sending end, and the video client which is responsible for decoding and displaying video frames at the receiving end. Application control consists of a demultiplexer at the sending end to demultiplex a video stream into several substreams, and a multiplexer at the receiving end to multiplex one or more substreams into a single stream for the video client. In particular, the demultiplexer generates three substreams of video information: I, P, and B. At the transport layer, each of these substreams is transported using a separate channel or flow, with each flow using a separate IP-multicast group address. The multiplexer at the application control of the receiving end multiplexes one or more of these substreams, depending on network load and the resources of the end hosts (e.g. the operational capabilities of the host receiver), and presents the multiplexed stream to the decoder. The application-control layer also includes a playback synchronizer that adapts the playback point for error recovery, as discussed more fully in Li, X. et al., "Layered Video 'Multicast with Retransmission (LVMR): Evolution of Error Recovery'", 97 Proceedings of NOSSDAV, May, 1997, and also contains a hierarchical rate controller that provides the inventive hierarchical rate control to the various receivers connected to the system, as more fully described herein below.

Figure 1A:
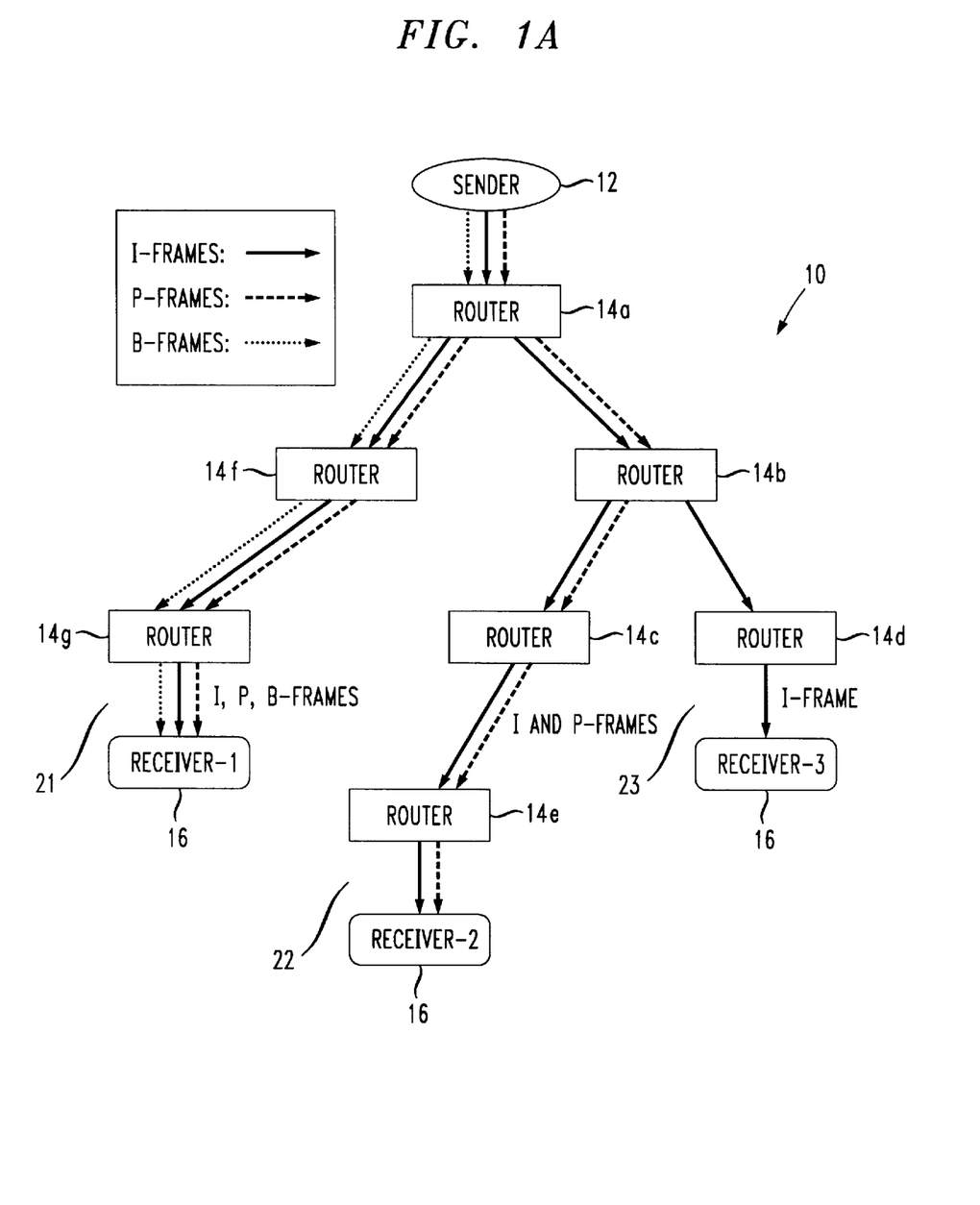
FIGS. 1a and 1b are schematic representations of the dynamically changing distribution of video layers to receivers in a communications network.
Figure 1B:
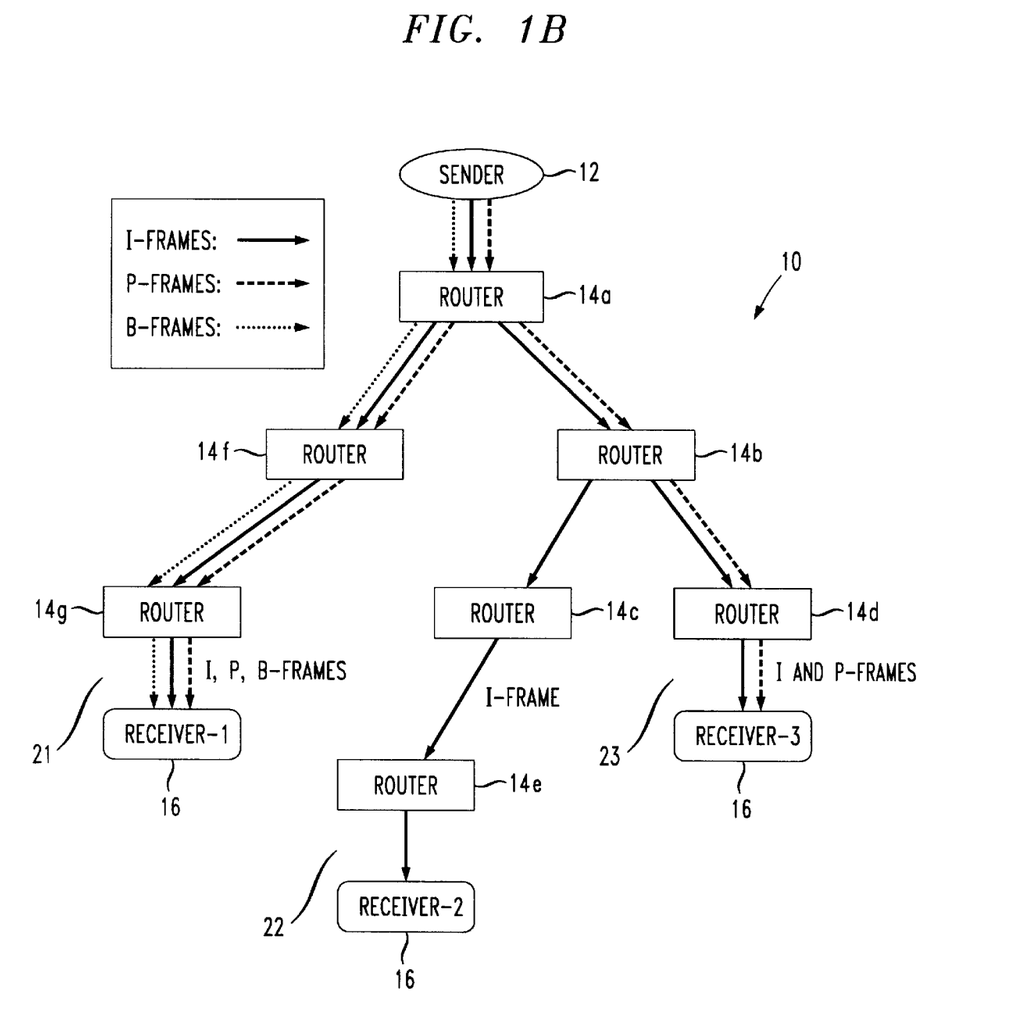

FIGS. 1a and 1b depict the dynamically changing distribution of video layers to receivers in a network. As shown in FIG. 1a, a network topology or configuration for video layer delivery 10 includes a sender 12 that transmits information over a network system. The information consists of I, P and B video information data channels or strings. The data channels are directed to a series of routers 14 and eventually to receivers 16 which are serviced by the routers. Topology 10 contains three branches 21, 22 and 23 defined by routers 14. As shown, first branch 21 has a single receiver (Receiver 1) which can accommodate all three video channels I, P and B and, therefore, routers 14a, 14f and 14g forward these three video channels to Receiver 1. On the other hand, Receiver 2 in the second branch 22 can only handle two video channels (channels I and P); thus, routers 14b and 14c forward these two channels to Receiver 2. Receiver 3 in the third branch 23 is shown as receiving a single video channel (I). It is noted that since the highest channel required by the Receivers serviced by router 14b is two (i.e. Receiver 2 can accommodate only channels I and P), router 14a must forward these channels to router 14b.

As seen in FIG. 1b, the dynamics of the network topology 10 is different—i.e. has changed—from the arrangement of FIG. 1a. In particular, Receiver 2 has dropped channel P and Receiver 3 has added channel P.

3. Discussion of Hierarchical Rate Control

The hierarchical rate control method of the present invention provides for receiver interaction with other receivers connected to the system to efficiently manage data transfer and, in particular, the transmission of video enhancement layers. The inventive method does not utilize feedback between the receivers and a sender via a centralized control, as such a technique is inefficient in large heterogeneous multicast sessions. Rather, in accordance with the invention, feedback is provided to designated network agents to enable and implement receiver inter-communication.

The network agents can be implemented as either regular or specialized receivers, depending on context. The agents are arranged in a hierarchy as described below and are responsible for collecting feedback from receivers and distributing consolidated information back to the receivers. This arrangement provides the information gathering capabilities of a centralized system while allowing distributed decision making capabilities among the receivers based on the consolidated information passed on to them by the agents.

4. The Hierarchical Approach

The inventive hierarchy of network agents uses multiple domains within a multicast group with an Intermediate Agent (IA) designated in every domain. Each domain may have one or more subnets associated with one or more subscribers. A domain can be a physical region, such as a geographical area, or a logical region such as a corporate intranet, or even a logical scope imposed by a time-to-live (TTL) field of IP packets. In each subnet within a domain, there is a designated Subnet Agent (SA). SAs are responsible for collecting the status of their associated subnets while IAs perform a similar function for their associated domains. Each IA compiles the information from the SAs in its domain and passes or shares the compiled information with the SAs which multicast the information to their corresponding subnets. Thus, the intelligence of the IAs propagates down to the receivers.

Figure 2:
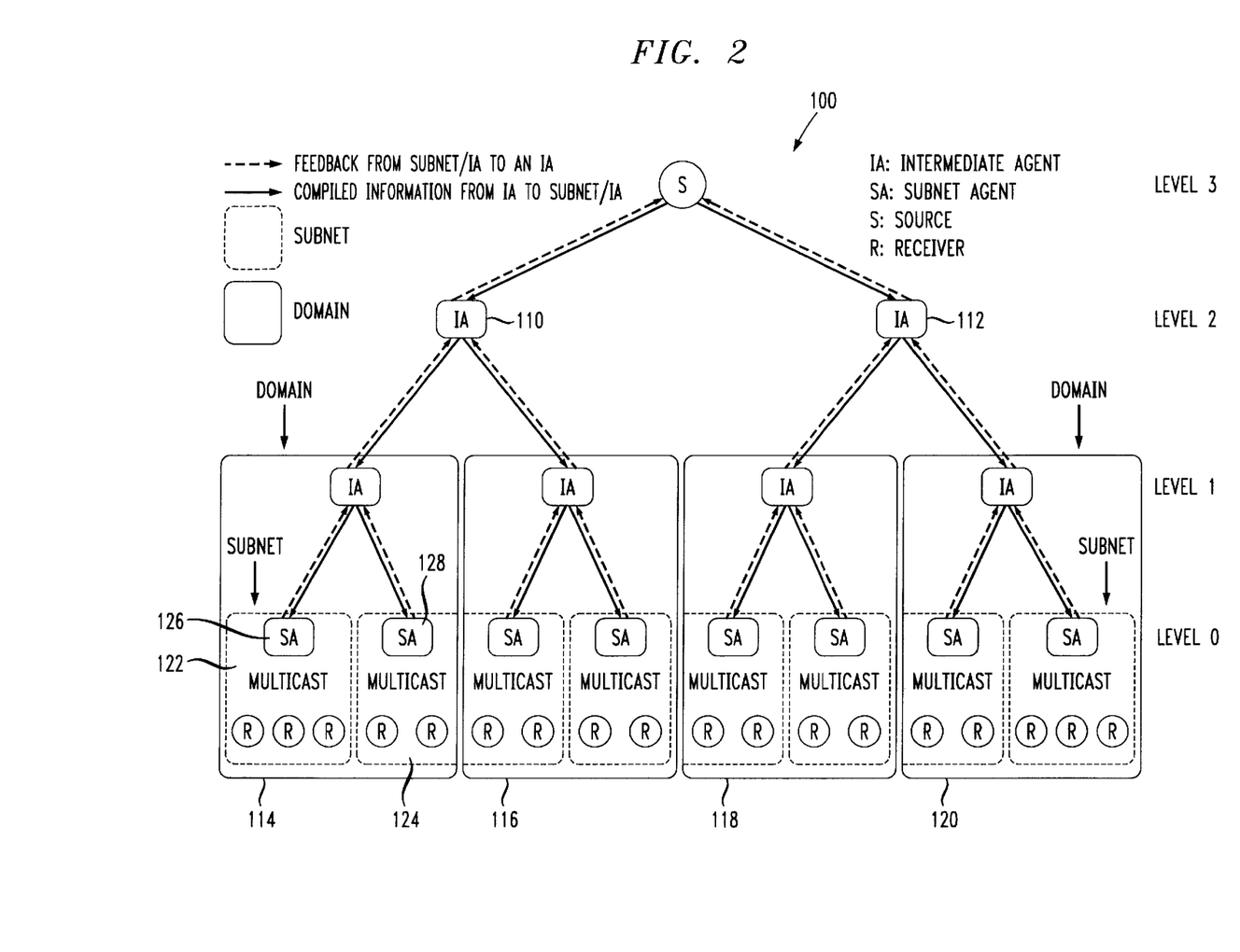
FIG. 2 depicts a schematic representation of a network system utilizing intermediate agents and subnet agents for hierarchical rate control of video data.

FIG. 2 depicts, a network system 100 utilizing IAs and SAs for hierarchical rate control of video data. The system 100 is arranged in a multiple level hierarchy having four levels (levels 0–3). A data source S is positioned at level 3 and communicates data to a pair of IAs 110 and 112 at level 2. Each of these IAs, in turn, communicate with a pair of domains, such that IA 110 communicates with domains 114, 116, and IA 112 communicates with domains 118, 120. As shown, each domain contains a pair of subnets and, thus, domain 114 by way of example contains subnets 122, 124, etc. with each subnet having an associated subnet agent SA that interacts with associated receivers. Accordingly, and as shown, subnet 122 has subnet agent (SA) 126 which interacts with 3 receivers, and subnet agent (SA) 128 which interacts with two receivers. The arrangement shown in FIG. 2 is for illustration only and numerous other configurations and arrangements (e.g. other levels) can be designed without departing from the scope of the present invention.

In the system 100 of FIG. 2, an IA at a lower level (e.g. level 2) passes its domain information to its next level IA (e.g. level 1), and so on until it reaches the source. Similarly, there is a flow of compiled information from a higher-level IA to its next lower level IA (just as the compiled information flows from IA to the SAs in a two-level hierarchy), and so on until it reaches all SAs. It is to be noted here that SAs and IAs are only logically separate from the receivers, and may be physically combined in the same hardware unit with the receivers.

In accordance with the present invention, and as stated above, receivers in each subnet and in each domain must have limited indirect interaction with each other so that information or intelligence concerning receiver attempts at receiving particular video channels can be shared by or partitioned among other receivers. Such shared intelligent partitioning of downloading history helps alleviate congestion because a receiver having such knowledge will not attempt to receive a high level video channel (e.g. channel B) if such an attempt will is known to generate a congestion condition resulting in a degradation of video signals received by, for example, other receivers in a common subnet. To successfully partition receiver history intelligence, it must be determined which receivers are affected when an add-layer experiment is performed, what can be determined from a failed add-layer experiment, and which receivers should learn from a failed add-layer experiment, i.e. to avoid an add attempt under similar circumstances similar to those of the failed attempt. To assist in responding to these inquiries, some definitions and notations must be provided.

A receiver is in video level n (Ln) if it subscribes to n video layers (the base layer and n-i enhancement layers). For example, if only three layers are used (I, P and B), a receiver is in level 2 if it receives the I and P layers, and is in level 3 if it receives the I, P, and B layers.

$SL_{max}$ and $DL_{max}$ respectively denote the highest acceptable level among the receivers in a subnet or a domain, and $SL_{max} \leq DL_{max}$. For simplicity, a single domain having multiple subnets is assumed; it will be appreciated, however, that the invention may be readily expanded to a multiple domain system.

Range A: $1 \leq L \leq SL_{max}$. If a receiver joins a layer in this range, it is not going to affect any other receiver;, i.e. if it becomes "congested" (CONG), this congestion can only be caused by overload of its own CPU as opposed to network congestion. There the affected region is only itself.

Range B: $SL_{max} < L \leq DL_{max}$. If a receiver joins a level in this range, it will affect (i.e. congest) receivers in the same subnet, and it may possibly affect some nodes outside of its subnet, but it will not affect any nodes outside of the domain. The potential affected region is now the entire domain.

Range C: $DL_{max} < L$ If a receiver joins a level in this range, it will affect receivers in the domain and may also affect receivers outside of the domain. This means that each receiver needs to know $SL_{max}$, SA needs to know $SL_{max}$ and $DL_{max}$, and IA needs to know $DL_{max}$.

CONG (A,l,X): Host A adds layer l causing the network path leading to host X to be congested.

L(X): Host X's video reception level.

There are three key observations that are fundamental to determining which receivers need to learn from which failed add-layer experiments.

Observation 1: $CONG(A,l,X) \rightarrow CONG(A,0,A)$ Assumption: In the routers, there is a separate buffer for each of the outgoing links.

If receiver A adds a layer l and, in the process, causes congestion to some other receiver/subnet, then receiver A must also be congested. In other words, if a receiver is not congested after its own add-layer experiment, then no other receiver/subnet should be congested due to the same action or experiment. This implies that congestion of a receiver in the network should not be correlated with an add-layer experiment if the receiver that performed the experiment did not experience congestion itself.

Observation 2: $CONG(A,l,X) \rightarrow L(X) \leq L(A)$

If receiver A adds layer l, it cannot bring congestion to nodes that are already receiving layer l. Thus, as a result of a receiver's add-layer experiment, congestion may only be caused at nodes that are at the same level as or at a lower level than the subject receiver. This implies that each receiver need only know about those add-layer experiments that involve the addition of layers higher than its current level.

Observation 3: $CONG(A,l,B) \rightarrow CONG(B,l,A)$

If as a result of receiver A adding layer l, some other receiver B gets congested, then receiver A would also be congested if B adds layer l under the same conditions. This implies that if there are receivers which are mutually affected by an add-layer experiment performed by any receiver, then the receivers should share information about the same experiments and results.

5. Collaborative Layer Drop

Typically, if a receiver senses congestion, then it may drop the highest layer that it receives in order to reduce the congestion. However, this practice does not always alleviate congestion in a multicast system because other receivers may still experience congestion. For example, if two receivers $R_A$ and $R_B$ (receiving 2 layers and 3 layers, respectively) are on the same subnet and experience congestion caused by a traffic overload on the shared link, then even if the receiver $R_A$ drops layer 2, congestion will not be decreased until receiver $R_B$ drops layer 3. For efficient alleviation of congestion, therefore, only level 3 should be dropped. Accordingly, the following conditions and results apply in the inventive method to coordinate efficient layer drop between receivers:

i. If a receiver $R_A$ is congested and finds another receiver $R_B$ on the same subnet that is also congested, and $L(A)<L(B)$, then $R_A$ should not drop layer $L(A)$ until after $R_B$ has dropped layer(s) $L(A)+1$ to $L(B)$.

ii. If an IA finds that a majority of the subnets (including the one(s) receiving layer $DL_{max}$) are congested, then it can send a mandatory message to get $DL_{max}$ dropped so as to decrease or avoid the congestion that is affecting the entire domain.

6. Add-layer Experiment Synchronization

In addition to congestion being caused from add layer experiments among receivers at the same level, simultaneous add layer experiments at different layers can also cause congestion. In order to avoid such concurrent experiments, a simple scheme can be applied. Let g denote the ID of the current video Group of Picture (GOP) that the receiver has received and let n denote the total number of layers. In accordance with this technique, a receiver receiving i layers can only add layer i+1 when $mod(g,n-1)=i-1$, where mod is a function of the remainder. For example, if there are 4 layers, then layer 2 can only be added if $mod(g,3)=0$, layer 3 can only be added if $mod(g,3)=1$, and layer 4 can only be added if if $mod(g,4)=2$. This technique provides for the conduct of experiments for adding different layers only at least a GOP number of frames away.

7. The Hierarchical Rate Control Protocols

The hierarchical rate control method of the present invention will now be described in greater detail with reference to FIG. 3, which schematically depicts an exemplary section of an internet or intranet topology 200. The depicted section receives data from a source (not shown). The data (e.g. video flow streams I, P, and B) are shown as solid lines and physical wiring connections between network components are depicted as dashed lines. An intermediate agent (IA) 202 communicates with and exchanges experiment history information—such as information concerning the history of adding experiments conducted by receivers in the section—with subnet agents (SA) 210, shown as $SA_1$–$SA_4$. Video information is provided to router 206a which is connected to and further distributes the video data to other routers 206b–206g via links 204($Ln_1$–$Ln_{10}$), and eventually to receivers $R_1$–$R_8$. Receivers $R_1$–$R_8$ are arranged into four subnets $N_1$–$N_4$.

Subnet $N_1$ contains receivers $R_1$, $R_2$ and $R_3$ and has $SL_{max}$=2. In other words, the highest number of video channels or layers received by a receiver in $N_1$ is two channels (I,P) which are received by receivers $R_2$ and $R_3$. A receiver in each subnet receiving $SL_{max}$ can be made to function as the SA for that subnet. Thus, receivers $R_2$ or $R_3$ may function as the subnet agent SA for $N_1$, and receiver $R_3$ is chosen for this purpose. Likewise, subnet $N_4$ has one receiver $R_8$ and a $SL_{max}$=3 (layers I, P, B). As only one receiver is presently assigned to $N_4$, that receiver $R_8$ is also the subnet agent $SA_4$.

Messages exchanged between various entities in the network, particularly between the Subnet Agents (SA) and the Intermediate Agent (IA), are made reliable by using Transmission Control Protocol (TCP). However, the communication between a receiver and its corresponding SA is made reliable by using a simple timer-based mechanism, in which the receiver retransmits the same message if the expected action does not take place within the predetermined time-out period.

For the sake of simplicity, the protocol is described using only two levels of hierarchy, meaning that there is a single IA, and several SAs, where the SAs exchange information with the IA. This is the system depicted in FIG. 3. However, the basic scheme can be easily extended to multiple levels of hierarchy, as will be readily known by those having ordinary skill in the art having knowledge of this disclosure.

8. The State Transition

Figure 3:
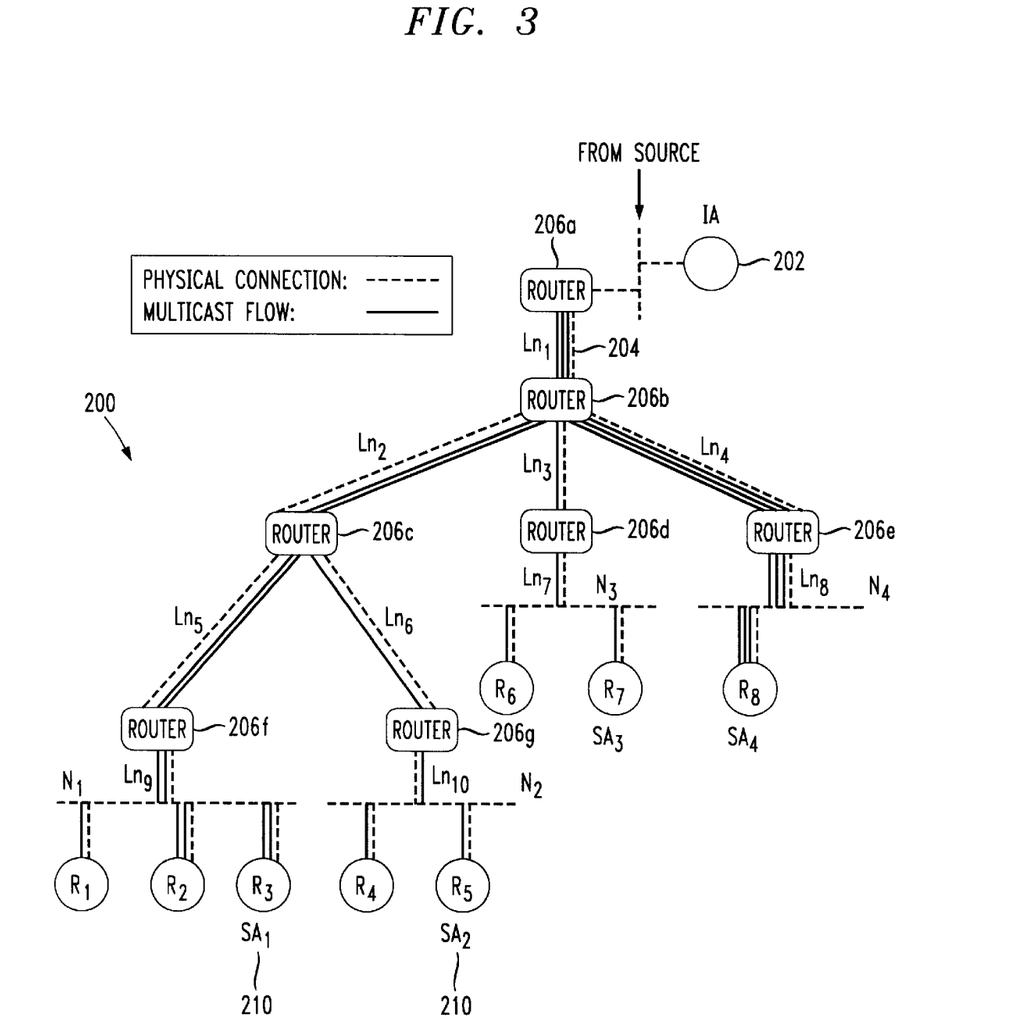
FIG. 3 depicts a schematic of an exemplary section of an internet topology.
Figure 4:
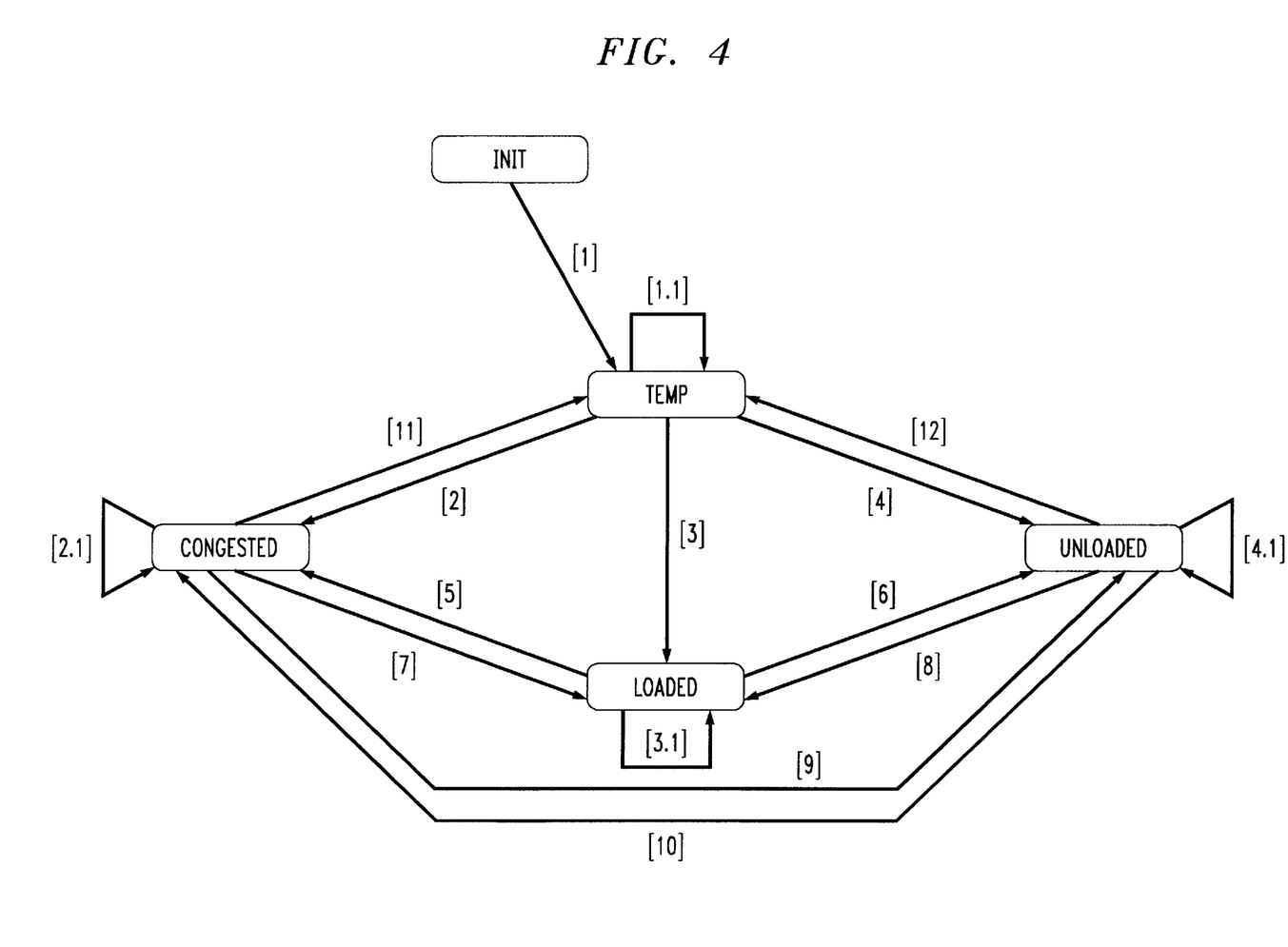
FIG. 4 depicts a state transition protocol diagram for LVMR.

FIG. 4 depicts a state transition diagram of protocol operation for the system of FIG. 3. A simplified discussion of the state transition diagram for the basic protocol can be found in the aforementioned publication by Li, X. et al., which disclosure is incorporated by reference herein. Each transition in FIG. 4 is associated with (1) a condition clause, (2) a send operation, (3) a receive operation, and (4) an action clause. The "condition" clause indicates that the "condition" must be satisfied in order for the transition to take place, the "send" operation indicates what message(s) are sent during the transition, the "receive" operation indicates what messages are received during the transition, and "action" clause indicates what action is taken by the protocol entity during the transition. Table A below lists condition parameters and their descriptions, and Table B below lists the transitions that can occur when certain conditions are met.

TABLE A

Parameters and Constants in the State Transition and Protocol

| Parameter | Description |
|---|---|
| δ | Time counter of how long a receiver has been continuously in certain state |
| $T_t$ | Time a receiver needs to spend in the TEMP state before transition to other states. |
| $T_c^i$ | Time a receiver need to remain in the CONGESTED state before dropping layer i. |
| $T_u^i$ | Time a receiver needs to remain in the UNLOADED state before adding layer i + 1. |
| $T_{c,0}$ | The default value for $T_c^i$ |
| $T_{c,add}$ | The default value for $T_c^i$ right after a layer-add experiment |
| $T_{u,min}, T_{u,max}$ | The value for $T_u^i$. $T_{u,min}$ is also the default value |
| $R_c, R_u$ | Unload-condition: $r \geq R_u$. Congestion-condition: $r \geq R_c$ |
| α | Factor to increase $T_u^i$ if adding layer i + 1 fails. |
| r | Packet loss rate during a period (usually a GOP) |

TABLE B

Receiver State Transition Table

| Transition | Description of Transition | |
|---|---|---|
| [1] | Send: | LAYER_REQ to subnet |
| | Receive: | LAYER_ACK (1 = $SL_{max}$) from SA |
| | Action: | Join layers 1 to $SL_{max}$ |
| [1, 1] | Condition: | δ < $T_t$ AND NOT Congestion-condition |
| [2] | Condition: | Congestion-condition |
| [2,1] | Condition: | δ ≥ $T_c^i$ AND Congestion-condition |
| [3] | Condition: | δ ≥ $T_t$ AND Load-condition |
| [3,1] | Condition: | Load-condition |
| [4] | Condition: | δ ≥ $T_t$ AND Unload-condition |
| [4,1] | Condition: | δ ≥ $T_u^i$ AND Unload-condition |
| [5] | Condition: | Congestion-condition |
| [6] | Condition: | Unload-condition |
| [7] | Condition: | Load-condition |
| [8] | Condition: | Load-condition |
| [9] | Condition: | Unload-condition |
| [10] | Condition: | Congestion-condition |
| [11] | Condition: | Congestion-condition AND δ ≥ $T_c^i$ |
| | Action: | drop layer i |
| [12] | Condition: | Unload-condition AND δ ≥ $T_u^i$ |
| | Action: | add layer i + 1 |

In table B, three conditions are described to assist state transitions: (1) Congestion-condition, (2) Load-condition and (3) Unload-condition. As stated in Li, X. et al. congestion can be detected by various factors, such as the packet loss rate exceeding a certain threshold, or the percentage of video frames missing deadlines exceeding a threshold. Similarly, if packet loss rate is below a certain threshold, and the percentage of video frames arriving late is below a given threshold, the network is in an unload condition. Any network condition that cannot be categorized either by "Congestion" or "Unload" is denoted by "Load". Periodically, each receiver does some simple statistics on the packet loss ratio and/or frame arrival timing in the past period and matches the result to one of the three conditions. Then state transition takes place after the statistics are obtained. All the timing parameters and constants are in the unit of such "period". In the example described herein the period is set to the time span of a GOP (Group of Picture) of MPEG frames.

The parameters involved in the state transitions are described in Table A. Parameters $T_u^i$, $T_c^i$ reflects the key ideas in hierarchical rate control protocol.

A receiver needs to remain in the UNLOADED state for $T_u^i$ time before adding video channel or layer i+1. Initially, for all the layers, $T_u^i$ is set to $T_{u,min}$ and should always stay within $T_{u,max}$. When a layer-adding experiments fails, $T_u$ is exponentially expanded ($T_u^i = T_u^i \alpha$) so as to avoid oscillation caused by another add-layer experiment that takes place too soon. With hierarchical rate control schemes, other receivers that could also possibly cause congestion when adding layer i+1 can "learn" from this failure by setting their $T_u^i$ to the same prolonged value. When an add-layer experiment succeeds, the $T_u$ is reduced ($T_u^i = T_u^i / \alpha$) and for the next layer, it is set as $T_u^{i+1} = T_u^i$.

A receiver needs to remain in the CONGESTED state for time $T_c^i$ before dropping layer i. $T_c^i$ is set to the default value of $T_{c,0}$ except in two cases: (1) immediately following the experiment of adding layer i, $T_c^i$ is set to a smaller value, $T_{c,add}$, such that if the newly added layer i brings too high a load to the network, the receiver will detect it quickly and drop layer i; (2) if a receiver (receiving i layers) is in the CONGESTED state and finds another receiver (receiving more than i layers) on the same subnet also congested, then it extends $T_c^i = T_c^i + 1$. The intuition is that if a receiver finds that on the same subnet, another receiver receiving higher layer(s) is also congested, then possibly the congestion is caused by the higher layer(s). So this receiver should wait longer before dropping its own layer.

9. The Protocol

There are six fundamental operations performed by a receiver in hierarchical rate control: (1) join-session, (2) leave-session, (3) add-layer, (4) drop-layer, (5) send-cong-msg and (6) pro-cong-msg. Each of these six operations is described below with reference to FIG. 4 and Table B. Note that "leave-session" messages and the operations by IA/SA have not been shown in the state diagram of FIG. 4.

i. join-session: A new receiver goes through the join-session procedure when it is in the INIT state.
  (a) A new receiver R announces to its subnet that it wants to join the multicast session. The announcement is made by multicasting (with a TTL of 1) a LAYER-REQ message to its subnet (label[1] in FIG. 4).
  (b) If an SA is already designated, then the SA multicasts a LAYER-ACK ($SL_{max}, T_u^i$) message to its subnet after receiving the LAYER-REQ message.
  (c) When R receives the LAYER-ACK(i,T) message it subscribes to i layers and sets $T_u^i = T$. If R does not receive a LAYER-ACK message within a certain time, it assumes that there is no current SA, so it becomes the SA and joins the base layer.

It is possible for two or more receivers to become SAs on the same subnet, and the control functionalities of this protocol still work in this situation, although some extra information distribution and processing may be involved.

ii. leave session:
  (a) If a receiver R that is not an SA decides to leave the session, it multicasts a message to inform the SA that it is leaving and then quits.
  (b) If a receiver R is an SA and wants to leave a session, the receiver must first choose another receiver to be the SA (if there are still other receivers on the same subnet). The receiver R multicasts an SA-LEAVE message to the group and the first receiver in the group that responds will be chosen as the next SA. If the receiver R does not receive any response within a certain time, R will resend the message and if again no response, then it assumes that there is no other receiver on the subnet.

iii. send-cong-msg:
A receiver R announces to its subnet when it is in the CONGESTED state. This announcement is performed by multicasting (with a TTL of 1) a CONG (i) message, where i is the receiver's video reception level.

iv. pro-cong-msg:
(a) If within a certain time interval more than one CONG (i) message, where $i=SL_{max}$, is received by the SA, it forms an IA with CONG(i) message showing that its subnet is congested. Note that this kind of congestion may, for example, result from add-layer experiments going on in another subnet or network load increase.
(b) When the IA gets a congestion message, it keeps the message for a preset period of time.

v. add-layer:
If a receiver is receiving i−1 layers and has been in the UNLOADED state for a certain time ($\delta \geq T_u^{i+1}$), it attempts to do an add experiment for layer i.
(a) If no congestion is observed at this node during a certain time $T_t$ after the experiment, or if $i \leq SL_{max}$, the add-layer operation is successful and complete.
(b) Otherwise the receiver drops layer i, extends $S_u^{i+1} = T_u^{i+1}*\alpha$, and multicasts a FAIL (i, $T_u^{i+1}$) message on the subnet. Then SA informs IA about the failure of the experiment by the same message.
(c) If IA receives a CONG(x) message from an SA and a FAIL(i,T) within a specified period of time, and x<i, IA forwards this FAIL message to the SA, and then SA multicasts it to the subnet. The receivers in the subnet updates their $T_u^{i-1}$ parameters accordingly. If the receiver R is currently receiving i−1 layers and in the UNLOADED state, then $\delta=0$. (The state time counter is reset to 0 so that from now on receiver R will also have to wait for at least $T_u^{i-1}$ before trying to add layer i. This also helps to achieve add layer experiment synchronization.)

vi. drop-layer:
If a receiver senses congestion, it may try to reduce its rate by dropping one or more enhancement layers; but this is not always the right approach. For example, with reference to FIG. 3, if congestion occurs on $Ln_5$ which services $R_1$, $R_2$ and $R_3$, then although $R_1$ senses the congestion, $R_1$ should not drop any layer, and $R_2$ and $R_3$ should both drop their highest layer (e.g. layer P).
(a) If a receiver (at level i) is in the CONGESTED state and hears a CONG(x), and x>1, then it extends $T_c^i = T_c^{i+1}$.
(b) If a majority of SAs report congestion within a short time, the IA requests the highest video layer in the domain to be dropped to decrease the congestion. A DROP ($DL_{max}$) message is sent to those SAs that reported CONG(i) within a certain time and $i=DL_{max}$. The SAs would multicast the DROP message to the subnet.
(c) After a receiver (receiving i layers) has been in the CONGESTED state for certain time ($\delta \geq T_c^i$), or after it hears a DROP(i) message, it drops the highest layer i.

10. Examples

Assume, in FIG. 3, that $R_1$ is at $L_1$ (level 1) and is ready to add layer 2. We refer to this experiment as the $L_1 \to L_2$ experiment. Since $SL_{max}^{(i)}=2$, $R_1$ can safely perform the experiment without affecting other receivers. However, if $R_2$, which is at $L_2$, wants to add layer 3 which is beyond $SL_{max}^{(1)}$, it multicasts ADD(3) message on the subnet ($N_1$) and SA, will inform IA about the experiment. The Subnet Agent of the affected subnet ($SA_2$ in this example) sends a CONG(1) message to the IA indicating congestion in subnet $N_2$. Also SA, sends a FAIL(3) message to the IA indicating congestion in subnet $N_1$, and hence failure of the experiment in its subnet. IA correlates congestion in subnet $N_2$ with the $L_2 \to L_3$ experiment done by $R_2$, and passes the information down to $SA_2$ with a FAIL(3,$T_u$) message. Note that this will prevent a $L_2 \to L_3$ experiment in $N_2$ for at least a time period $T_u$.

As should by now be appreciated from the foregoing description, the hierarchical rate control method and apparatus provide for receiver interaction within subnets, through subnet agents, and subnet interaction within domains through intermediate agents, to provide for improved and efficient video data flow. This is accomplished by regulating data add experiments conducted by receivers and by sharing information concerning failed add experiments, with receivers through SA's and IA's.

Thus, while there have been shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all elements and/or method steps which perform substantially the same function in substantially the same way to achieve the same result as the elements specifically disclosed in the specification. Thus, the preferred embodiment and examples described herein are for illustrative purposes only and are not to be construed as limiting the scope of the present invention which is properly delineated only in the appended claims.

We claim:

1. A method for hierarchically controlling the transmission rate of a transmitted video signal having layers of data from a sender to a plurality of receivers in a communications network for regulating the addition of video data layers to an existing video signal received by the receivers to thereby form the transmitted video signal, comprising the steps of:
   dividing the communication network into domains;
   appointing an intermediate agent (IA) for each domain;
   dividing each domain into subnets, with each receiver being associated with one of said subnets;
   appointing a subnet agent (SA) for each subnet;
   gathering, in said SAs, add-layer experiment history data from prior attempts by receivers associated with respective ones of said SAs to add a video data layer to a receiver's respective existing video signal; and
   communicating information, based on said gathered experiment history data, from said SAs to said plurality of receivers and to said IAs to provide collected information to said plurality of receivers concerning conditions for adding desired video data layers to, and for dropping video data layers from, each receiver's respective existing video signal so as to avoid network data congestion by preventing video layer addition when certain of said conditions exist and so as to efficiently reduce data congestion by directing specific ones of the receivers to drop selected ones of the video data layers from corresponding existing video signals.

2. The method of claim 1, wherein said add-layer experiment history data comprises congestion data resulting from an increase in the transmission rate of said transmitted video signal from prior add-layer experiments performed by said plurality of receivers.

3. The method of claim 1, wherein said video signal data layers are hierarchically designated from a lowest status to a highest status and wherein said step of communicating comprises instructing a receiver, in one of a domain and a subnet, having a greater number of video data layers in its respective existing video signal to drop a data layer having a highest status level in said respective existing video signal when a congestion condition is detected.

4. The method of claim 1, wherein the video signal data layers comprise a base layer and at least two enhancement layers.

5. The method of claim 3, wherein the video signal data layers comprise a base layer and at least two enhancement layers, and wherein the base layer is designated as the layer having the lowest status.

6. A device for hierarchically controlling the transmission rate of a transmitted video signal having layers of data from a sender to a plurality of receivers in a communications network for regulating the addition of video data layers to an existing video signal received by the receivers to thereby form the transmitted video signal, comprising:

means for dividing the communication network into domains;

an intermediate agent (IA) associated with each domain;

means for dividing each domain into subnets, with each receiver being associated with one of said subnets;

a subnet agent (SA) associated with each subnet, each of said SAs being in communication with a respective IA associated with a corresponding subnet;

means for obtaining, in said SAs, add-layer experiment history data from prior attempts by receivers associated with respective ones of said SAs to add a video data layer to a receiver's respective existing video signal; and means for communicating information, based on said gathered experiment history data, from said SAs to said plurality of receivers and to said IAs to provide collected information to said plurality of receivers concerning conditions for adding desired video data layers to, and for dropping video data layers from, each receiver's respective existing video signal so as to avoid network data congestion by preventing video layer addition when certain of said conditions exist and so as to efficiently reduce data congestion by directing specific ones of the receivers to drop selected ones of the video data layers from corresponding existing video signals.

7. The device of claim 6, wherein said add-layer experiment history data comprises congestion data resulting from an increase in the transmission rate of said transmitted video signal from prior add-layer experiments performed by said plurality of receivers.

8. The device of claim 6, wherein said video signal data layers are hierarchically designated from a lowest status to a highest status and wherein said means for communicating comprises means for instructing a receiver, in one of a domain and a subnet, having a greatest number of video data layers in its respective existing video signal to drop a data layer having a highest status level in said respective existing video signal when a congestion condition is detected.

9. The device of claim 6, wherein the video signal data layers comprise a base layer and at least two enhancement layers.

10. The method of claim 9, wherein the video signal data layers comprise a base layer and at least two enhancement layers, and wherein the base layer is designated as the layer having the lowest status.

* * * * *